(12) United States Patent
Larsen et al.

(10) Patent No.: US 6,828,263 B2
(45) Date of Patent: Dec. 7, 2004

(54) HIGH TEMPERATURE SEALING MATERIAL

(75) Inventors: Jørgen Gutzon Larsen, Bagsværd (DK); Peter Halvor Larsen, Rosklide (DK); Carsten Bagger, Roskilde (DK)

(73) Assignee: Haldor Topsoe A/S, Lyngby (DK)

(*) Notice: Subject to any disclaimer, the term of this patent is extended or adjusted under 35 U.S.C. 154(b) by 133 days.

(21) Appl. No.: 10/191,432

(22) Filed: Jul. 10, 2002

(65) Prior Publication Data

US 2003/0040420 A1 Feb. 27, 2003

Related U.S. Application Data

(63) Continuation of application No. 09/459,535, filed on Dec. 13, 1999, now abandoned.
(60) Provisional application No. 60/112,039, filed on Dec. 15, 1998.

(51) Int. Cl.[7] .............. C03C 8/14; C03C 8/20; C03C 8/24
(52) U.S. Cl. .............. 501/15; 501/17; 501/18; 501/32; 429/30; 429/36; 65/36
(58) Field of Search .............. 429/30, 35, 36; 501/15, 17, 18, 32; 65/36

(56) References Cited

U.S. PATENT DOCUMENTS

| | | | |
|---|---|---|---|
| 3,804,666 A | 4/1974 | Eppler et al. | |
| 3,837,869 A | 9/1974 | Bacher et al. | |
| 3,891,452 A | 6/1975 | Low et al. | |
| 4,624,934 A | 11/1986 | Kokubu et al. | |
| 5,009,709 A | 4/1991 | Ibsen et al. | |
| 5,045,402 A | 9/1991 | Adams et al. | |
| 5,079,194 A | 1/1992 | Jean et al. | |
| 5,141,899 A | 8/1992 | Jean et al. | |
| 5,153,070 A | 10/1992 | Andrus et al. | |
| 5,179,047 A | 1/1993 | Chiba | |
| 5,273,837 A * | 12/1993 | Aitken et al. | ........... 429/30 |
| 5,453,331 A * | 9/1995 | Bloom et al. | ........... 429/32 |
| 5,679,144 A | 10/1997 | Thiel et al. | |
| 5,698,019 A | 12/1997 | Frank et al. | |
| 5,698,482 A | 12/1997 | Frank et al. | |
| 6,291,092 B1 * | 9/2001 | Kohli et al. | ........... 429/33 |

FOREIGN PATENT DOCUMENTS

| | | |
|---|---|---|
| JP | 06060891 | 3/1994 |
| JP | 09120828 | 5/1997 |

* cited by examiner

*Primary Examiner*—David Sample
(74) *Attorney, Agent, or Firm*—Dickstein Shapiro Morin & Oshinsky LLP

(57) ABSTRACT

Glass composition for use as sealing material in fuel cells, comprising a glass matrix with main components consisting of $SiO_2$, $Al_2O_3$, and one or more compounds from group I metal oxides and/or group II metal oxides, and a filler material evenly dispersed in the matrix, wherein the filler material consists of particles of one or more refractive compounds from the group: $MgO$—$MgAl_2O_4$, stabilized zirconia, rare earth oxides, $(Mg,Ca)SiO_3$, $Mg_2SiO_4$, $MgSiO_3$, $CaSiO_3$, $CaZrO_3$, $ThO_2$, $TiO_2$, $M^{II}AlSi_2O_8$, where $M^{II}$=Ca, Sr or Ba.

7 Claims, 1 Drawing Sheet

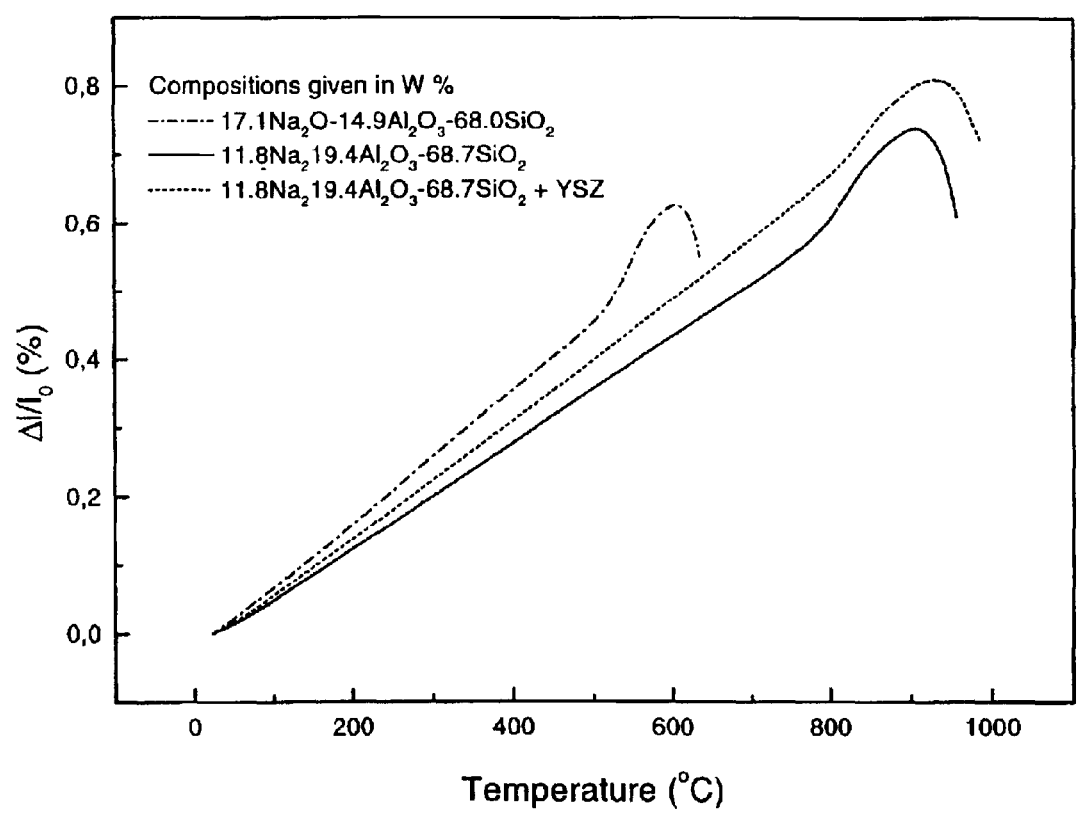

HIGH TEMPERATURE SEALING MATERIAL

This is a continuation of U.S. Ser. No. 09/459,535, filed Dec. 13, 1999, now abandoned, and claims the benefit of U.S. Provisional Application No. 60/112,039, filed Dec. 15, 1998.

BACKGROUND OF THE INVENTION

The invention concerns a glass composition for use as sealing material in fuel cells! preferably in the solid oxide fuel cells (SOFC) of the stacked planar type. Typically, such fuel cells are composed of Y-stabilized $ZrO_2$, (YSZ) electrolyte with electrodes and contact layers to the electron conducting plate Interconnect (IC), which makes the series connection between the cells. Gas tight sealings are vitally important for the performance, durability and safety operation of the fuel cells including the manifold and heat exchanger.

The difficulties in providing a suitable sealing material are numerous:

The sealing material should be able to adhere to the fuel cell components at a heat treatment not higher than 1300° C. which is the maximum temperature heat treatment of a fuel cell stack, and be resilient in order to take up deformations, e.g. due to TEC differences between the fuel cell components, and at the same being able to withstand a certain overpressure at the operation temperature which require a viscosity of more than $10^5 dPas \cdot s$. The thermal expansion coefficient (TEC) should be in the range $9-13 \cdot 10^{-6} K^{-1}$ in order not to initiate cracks in the fuel cell components. Furthermore, the sealing material has to be stable over a time span of say 40.000 h without deteriorating crystallization or reactions with the other materials as well as with the ambient gasses, atmosphere containing steam, methane, hydrogen, carbonmonoxide and carbondioxide or nitrogen and oxygen.

Glass or glass ceramic seals may fulfil the requirements established above and according to literature quite a range of potential glasses have been reported:

TABLE 1

SOFC SEALING MATERIALS

Alkaline oxide silicate glasses $Na_2O$—$CaO$—$SiO_2$
$Li_2O$—$ZnO$—$Al_2O_3$—$SiO_2$ and $MgO$—$ZnO$—$SiO_2$
Alkali-$Al_2O_3$—$SiO_2$
Alkali-$B_2O_3$—$SiO_2$
$Na_2O$—$SiO_2$
$Li_2O$—$SiO_2$
Mica Glass Ceramics Commercially available mica glass-ceramic
Alkaline-Earth Oxide Borosilicate/Silicaborate Glasses Alkaline-Earth-$B_2O_3$—$SiO_2$
$SrO$—$La_2O_3$—$Al_2O_3$—$B_2O_3$—$SiO_2$/
$SiO_2$—$B_2O_3$
$BaO$—$As_2O_3$—$Al_2O_3$—$B_2O_3$—$SiO_2$
Alkaline-Earth Alumina Silicates $SiO_2$ based glass-ceramics
$MgO$—$Al_2O_3$—$SiO_2$
$CaO$—$Al_2O_3$—$SiO_2$ According to Ley et al. (1996), each of these glass types have a drawback: the alkalis and alkali silicates and borates will react with the fuel cell components. The alkali borate glasses have too low TEC and soda-lime glasses too low viscosity.

In contrast several glass compositions within the $SrO$—$La_2O_3$—$Al_2O_3$—$B_2O_3$—$SiO_2$ system should be suitable (K. L. Ley, M. Krumpelt, R. Kumar, J. H. Meiser & I. Bloom, 1996, J. Mater. Res., Vol. 11, No 6, pages 1489–1493).

The present invention is in contrast to the conclusion of the authors above based on highly viscous polymerized alkali-alumina-silicate glass seals, which are reluctant to crystallize at elevated temperature. An example of a highly polymerized glass is pure $SiO_2$ glass, which has a polymerized 3D network (as the crystalline phase, quartz) based on $SiO_4^{4-}$ tetrahedra, where each oxygen ion connects two Si ions (B. E. Warren & Biscoe, 1938, J. Am. Ceram. Soc. 21, page 29). By addition of group I, II and III metal oxides this network is broken and the softening point, the viscosity and the melting point decreases significantly. It is possible to retain a polymerized structure of the melt with a high viscosity by substituting $SiO_2$ with $NaAlO_2$ (D. C. Boyd & D. A. Thompson, in Ullmann, Vol. 11, page 815). Accordingly, a $NaAlSi_3O_8$ melt has a high viscosity of $10^{8.5}$ dPas·s at 1120° C. (H. Rawson, 1967, Academic Press, London and New York, page 89). This melt is assumed to have a 3D network $(Si_{1-x}, Al_x)O_4^{4-x-}$ network structure, where $xNa^+$ compensate the extra negative charge, similar to the 3D network in the mineral albite with the same composition. Crystallization from such a highly viscous melt held nearly 100° C. below the melting point may take years due to the high viscosity (H. Rawson, 1967). By addition or subtraction of $NaAlSiO_4$, $SiO_2$, it is possible to reach two eutectic melting temperatures at 1062° and 1068° at compositions: $NaAlSiO_4$: $SiO_2$, 37.0:63.0 wt % and 65.0:35 wt %, respectively (J. F. Schairer, J. Geol. 58, No 5, 514, 1950). For the system: $KAlSiO_2$, $SiO_2$, an eutectic point of 990±20° C. may be obtained at a composition of $KAlSiO_4$: $SiO_2$ equal to 32.8:67.2 wt % (J. F. Schairer, N. L. Bowen, Bull Soc, Geol. Finland, 20.74 (1947).

The TEC of a $NaAlSi_3O_8$ glass is $7.5 \cdot 10^{-6} K^{-1}$, which is lower than the SOFC components $10.0-13 \cdot 10^{-6}$. The TEC of the albite glass can be increased slightly by addition of $NaAlO_2$, whereas a value of $10.4 \cdot 10^{-6} K^{-1}$ may be obtained by addition of $Na_2O$ giving a cation composition of $Na_{3.33}Al_{1.67}Si_5$ (O. V. Mazurin, M. V. Streltsina & T. P. Shvaikoshvaikoskaya, Handbook of glass data, part C, page 371, from K. Hunold & R. Brückner, 1980a, Glastech. Ber. 53, 6, pages 149–161). Higher values up to more than $12 \times 10^{-6} K^{-1}$ can be obtained by further addition of $Na_2O$ according to these authors.

An example of a $NaAlSi_3O_8 + Na_2O$ TEC matched glass for sealing yttria stabilized zirconia is shown in FIG. 1. Addition of $K_2O$ will have an even higher effect on the TEC.

Addition of $Na_2O$ and $K_2O$ alone will decrease the viscosity and the $T_{glass}$ and $T_{softening}$ as illustrated in Table 2 for $Na_2O$, which will be necessary for operation temperatures below 1000° C.

TABLE 2

|  | $T_g$ (° C.) | $T_s$ (° C.) |
|---|---|---|
| 11.8 $Na_2O$ – 19.4$Al_2O_3$ – 68.7$SiO_2$ | 786 | 910 |
| 17.1 $Na_2O$ – 14.9$Al_2O_3$ – 68.0$SiO_2$ | 515 | 607 |
| 11.8 $Na_2O$ – 19.4$Al_2O_3$ – 68.7$SiO_2$ + YSZ | 814 | 929 |

Alkali-addition, however, will cause an increased reaction rate with the other fuel cell components and an evaporation of sodium and potassium, so that this solution is best suited for low operation temperatures. Small amounts of $BO_3$ addition can also be used to decrease the melt temperature and viscosity. An alternative to the addition of alkalies in order to increase the TEC is to use fillers with a high TEC and (Y. Harufuji 1992: Japanese Patent No 480,077 A2) and (Y. Harufuji 1994, Japanese Patent No 623,784 A2) thus Harufuji mentions different fibres of carbon, boron, SiC, polytitanocarbosilane, $ZrO_2$ and $Al_2O_3$ and powders of $Al_2O_3$, $ZrO_2$, $SiO_2$, MgO, $Y_2O_3$ and CaO and Al, Ag, Au and Pt. To this list we can add stabilized $ZrO_2$, $TiO_2$, MgO—$MgAl_2O_4$ composites, $(Mg,Ca)SiO_3$, $Mg_2SiO_4$, $MgSiO_3$, $CaSiO_3$, $CaZrO_3$ and $M^{II}AlSi_2O_8$, where $M^{II}$=Ca, Sr and/or Ba (rare earth oxides, e.g. $CeO_2$, $Eu_2O_3$ and $ThO_2$) ($Li_2Si_2O_5$ may be used at temperatures below 1000° C.).

Other alkalisilicates may be used as fillers for low temperature operation. A combination of alkali and filler addition can be used to obtain optimal TEC, viscosity and the softening point $T_s$. Also addition of small amounts (<wt %) $B_2O_3$ instead of or together with $Na_2O$ combined with addition of high TEC fillers mentioned above is a possibility. The filler addition will reduce the exposed surface of the glass and thus the evaporation of the more volatile constituents of the glass.

Deteriorating Reactions May Involve:

(1) SiO evaporation may occur under reducing condition on the anode side condensation may take place in other areas of the fuel cell system. Apparently this process is slow.

(2) Volatile sodium and potassium may react with the other fuel cell materials, e.g. the chromite of the interconnection plate. The evaporation is strongly influenced by the sodium surplus of the glass. For this reason the sealing glasses with alkali/Al-ratios above 1 should only be used in fuel cells with low operation temperatures.

SUMMARY OF THE INVENTION

According to the invention there is provided a glass composition comprising a glass matrix with main components consisting of $SiO_2$, $Al_2O_3$ and one or more compounds from group I metal oxides, and a filler material evenly dispersed in the matrix, wherein the filler material consists of particles of one or more refractive compounds from the group: ($Al_2O_3$, MgO,) rare earth oxides, MgO—$MgAl_2O_4$ composites, stabilized zirconia, $(MgCa)SiO_3$, $Mg_2SiO_4$, $MgSiO_3$ $CaSiO_3$, $CaZrO_3$, $ThO_2$, $TiO_2$ and the $M^{II}AlSi_2O_8$, where $M^{II}$=Ca, Sr and/or Ba. For low temperature application alkalisilicate fillers may be used.

The filler material is added to the sealing glass in order to adjust the thermal expansion coefficient, so that it matches the TEC of the other parts of the fuel cell in addition the stability of the glass may be improved and the viscosity increased.

Preferred embodiments of the composition contain $Na_2O$ or $K_2O$ or both in amounts such that the stoichiometric molar ratio of $Al_2O_2$ to $Na_2O$ or $K_2O$ is in the range of 0.1–1.3 in order to reach an optimum TEC, while at the same time avoiding too much alkali metal that may react with the other materials in the cell stack.

One or more compounds of group II metal oxide may be components of the glass matrix. Known glass compositions with main components comprising $SiO_2$, $Al_2O_3$, and one or more compounds from group I or group II metal oxides are advantageous for sealing fuel cells with gas separators of La—Sr/Ca/Mg—Cr/V—O interconnections of ceramic material or a metal alloy, e.g., Cr—Fe—$Y_2O_3$ material and with an operating temperature above 600° C. In particular, compositions that within the glass have evenly dispersed a refractive filler material consisting of particles of one or more compounds from the group: MgO, MgO—$MgAl_2O_4$ composites, stabilized zirconia, rare earth oxides (especially $Eu_2O_3$ and $CeO_2$), $ThO_2$, $TiO_2$, $(MgCa)SiO_3$, $Mg_2SiO_3$, $CaSiO_3$, $CaZrO_3$, and $M^{II}AlSi_2O_8$, ($M^{II}$=Ca, Sr or Ba).

In a preferred embodiment of the invention commercially available feldspar or nepheline syenite starting materials may be used for making the basic glass material.

The starting material is melted at about 1550° C. for one hour in an alumina or platinum crucible. The melted material is then quenched in water, crushed and ground to glass powder with a particle size of less than 90 μm. The glass powder having a TEC of about $75\times10^{-7}$/K is then mixed with a filler, e.g. MgO (TEC $130\times10^{-7}$/K) with a grain size of less than 10–40 μm in ratio of 2:3.5 (vol.) in order to obtain a TEC of $110\times10^{-7}$/K.

Glass sealing are produced by filling the mixed powder into graphite forms followed by stamping and removal of excess of powder. The powder is then sintered in a furnace in $N_2$-atmosphere at 750° C. for 5 hours and at 1300° C., for one hour. Glass seals for narrow gaps <1 mm (e.g. in the electrode area) are produced by tape-casting of glass and filler mixtures.

EXAMPLE 1

A commercial available feldspar ($SiO_2$=68.4, $Al_2O_3$=19.1, $Fe_2O_3$=0.1, CaO=2.0, $Na_2O$=7.5=$K_2O$=2.8; melt point 1270° C.) is melted at 1550° C. in one hour in a $Al_2O_3$ or Pt crucible. Subsequently, the melt is quenched in water from 1000° C., crushed and grounded to $\leq$90 μm in a porcelain mill half filled with porcelain balls. The glass powder thus obtained with a TEC of ~$75\times10^{-7}$/K is mixed with the preferred filler of calcined (1700° C.) MgO with a TEC of $130\times10^{-7}$/K and a grain size of 10–40 μm in a ratio of glass MgO of 2:3.5 in order to obtain a TEC of $110\times10^{-7}$/K. Glass sealings in the shape of triangular rods are produced by filling the mixed powder into a graphite cast form with V-shaped grooves, followed by stamping and removal of excess powder. The composition is sintered in a furnace in $N_2$-atmosphere at 750° C. for 5 hours and at 1300° C. for 2 hours. The produced triangular rods may be machined to the wanted dimensions. If the viscosity is too high addition of small amounts (<5%) $B_2O_3$ and/or $Na_2O$ may be an advantage.

EXAMPLE 2

As in Example 1 except that the commercial feldspar powder (<90 μm) is mixed with the calcined (1700° C.) MgO powder and melted in graphite cast forms above 1300° C. for 5 hours.

EXAMPLE 3

Glass is produced from dried powder of:

| | |
|---|---|
| $SiO_2$ | 1442.08 g (<1 μm) |
| $Al_2O_3$ | 407.84 g (<1 μm) |
| $Na_2CO_3$ | 423.9 g (>1 μm) |

The powder is mixed in a 5 liter PE bottle with 20–30 mm porcelain balls for 24 hours. The powder is poured into $Al_2O_3$ crucibles and heated to 1550° C. for 2 hours and subsequently quenched from 600° C. in $H_2O$. The quenched materials thus obtained is crushed to <9 mm grains and grounded in a porcelain mill for 17 hours with 20–30 mm sized balls to glass powder with a particle size of less than 100 μm.

The glass powder is then mixed with 50 wt %, $ZrO_2$ stabilized with 8 mole % $Y_2O_3$ spherical 40–60 µm powder, calcined at 1700° C. and poured into a graphite cast form, as described in Example 1, and then sintered at 750° C. for 5 hours and at 1125° C. for one hour followed by oven cooling. At FIG. 1 the expansion curve is given for this mixture.

EXAMPLE 4

Glass, produced as in Example 1 or 2, and a filler material (e.g. MgO or yttria stabilized zirconia) are mixed by ball milling for 2 hours with a dispersing agent, polyvinylpyrrolidon dissolved in methylethylketon and ethanol. Subsequently, a binder mixture of polyvinylbutyral, dibutylphtalat, polyethylenglycol, Additol (Hoechst) (dissolved in methylethylketon and ethanol) is added and the ball milling is continued for 24 hours. The so-produced slurry is casted onto a moving substrate and allowed to dry for 24 hours before removal.

The green tapes are cut into the desired dimensions and are applied to the sealing area in the green state. The sealing is achieved by a subsequent heat treatment up to 1200° C. using a temperature ramp below 50° C./h in the range up to 500° C.

EXAMPLE 5

A composition according to Beall (1986) (J. H. Simmons, D. R. Uhlmann, G. H. Beall (eds.) in 1982: Advances in Ceramics, Vol. 4, page 291, Am. Ceram. Soc.) of:

| | |
|---|---|
| $SiO_2$ | 38.9 |
| $Al_2O_3$ | 13.7 |
| MgO | 11.0 |
| SrO | 10.1 |
| BaO | 14.0 |
| $MgF_2$ | 12.6 | is produced by mixing the oxide components and $MgF_2$ in a high intensity vibration mill with $Al_2O_3$ balls. The composition is then melted at 1550° C. for one hour. The thus produced glass is milky with a TEC of $110 \times 10^{-4}$/K according to Beall (1986). The glass is rather viscous and did not adhere well to the cell stack material. The adherence to these materials can be improved by addition of small amounts (up to 5%) of $B_2O_3$ and/or alkaline metals.

What is claimed is:

1. A method of sealing a fuel cell by adhering a glass composition thereto, the glass composition comprising a glass matrix having main components consisting of $SiO_2$, $Al_2O_3$, and one or more compounds from the group consisting of group I metal oxides and group IIA metal oxides for sealing fuel cells operating at temperatures up to 1000° C., wherein a filler material is evenly dispersed in a powder used to form the glass matrix prior to firing, the filler material comprising particles of one or more compounds from the group: $MgO$—$MgAl_2O_4$, stabilized zirconia, rare earth oxides, (Mg, Ca) $SiO_3$, $Mg_2SiO_4$, $MgSiO_3$, $CaSiO_3$, $CaZrO_3$, $ThO_2$, $TiO_2$ and $M^{II}AlSi_2O_8$, where $M^{II}=Ca^{2+}$, $Sr^{2+}$ and/or $Ba^{2+}$, and an alkali silicate.

2. A method according to claim 1, wherein the alkali silicate is $Li_2Si_2O_5$.

3. A method according to claim 1, wherein the alkali silicate is other than $Li_2Si_2O_5$ and the fuel cell is operated at a temperature below 1000° C.

4. A method according to claim 1, wherein the powder used to form the glass matrix is either feldspar or nepheline syenite.

5. A method according to claim 1, further comprising adding $B_2O_3$ to the glass matrix in amounts up to 10%.

6. A method according to claim 5, wherein the $B_2O_3$ is added to the matrix in amounts up to about 5%.

7. A method according to claim 1, wherein a proportion of the powder used to form the glass matrix to the filler is about 2:3.5 on a volume basis.

* * * * *